(12) United States Patent
Nam

(10) Patent No.: US 10,132,962 B2
(45) Date of Patent: Nov. 20, 2018

(54) OPTICAL SHEET COMPRISING NANOPATTERN AND METHOD FOR MANUFACTURING SAME

(71) Applicant: KOLON INDUSTRIES, INC., Gwacheon (KR)

(72) Inventor: Si Wook Nam, Yongin (KR)

(73) Assignee: KOLON INDUSTRIES, INC., Gwacheon-si (KR)

(*) Notice: Subject to any disclaimer, the term of this patent is extended or adjusted under 35 U.S.C. 154(b) by 0 days.

(21) Appl. No.: 15/513,345

(22) PCT Filed: Sep. 25, 2015

(86) PCT No.: PCT/KR2015/010207
§ 371 (c)(1),
(2) Date: Mar. 22, 2017

(87) PCT Pub. No.: WO2016/048091
PCT Pub. Date: Mar. 31, 2016

(65) Prior Publication Data
US 2017/0299776 A1    Oct. 19, 2017

(30) Foreign Application Priority Data

Sep. 25, 2014  (KR) .................. 10-2014-0128162
Sep. 23, 2015  (KR) .................. 10-2015-0134921

(51) Int. Cl.
*G02B 1/11*  (2015.01)
*B29C 59/04*  (2006.01)
(Continued)

(52) U.S. Cl.
CPC .............. *G02B 1/11* (2013.01); *B29C 59/022* (2013.01); *B29C 59/04* (2013.01); *G02B 1/118* (2013.01);
(Continued)

(58) Field of Classification Search
CPC ................ G02B 1/11; G02B 2207/101; G02F 1/133502; B29C 59/022; B28C 59/04;
(Continued)

(56) References Cited

U.S. PATENT DOCUMENTS 9,500,777 B2 *  11/2016  Ibuki ..................... G02B 1/118
9,625,618 B2 *  4/2017   Yamamoto .............. G02B 1/04
(Continued)

FOREIGN PATENT DOCUMENTS

CN    101809046       8/2010
JP    2012-204584     10/2012
(Continued)

OTHER PUBLICATIONS

KIPO, International search Report of Application No. PCT/KR2015/010207, dated Jan. 13, 2016.
(Continued)

*Primary Examiner* — William R Alexander
*Assistant Examiner* — Grant A Gagnon
(74) *Attorney, Agent, or Firm* — Lex IP Meister, PLLC

(57) ABSTRACT

This invention relates to a method of manufacturing an optical sheet, including: (S1) forming a single layer by feeding a curable resin composition, (S2) obtaining the single layer having a transferred nanopattern on a surface thereof by passing the single layer formed in (S1) through a release mold having a nanopattern having a pitch of 50 to 500 nm and an aspect ratio of 1.0 to 5.0, and (S3) curing the single layer having the transferred nanopattern obtained in (S2).

9 Claims, 2 Drawing Sheets (a)

(b)

(51) Int. Cl.
*B29C 59/02* (2006.01)
*G02F 1/1335* (2006.01)
*G02B 1/118* (2015.01)
*B29K 33/04* (2006.01)
*B29K 105/00* (2006.01)

(52) U.S. Cl.
CPC ........ *G02F 1/1335* (2013.01); *B29K 2033/04* (2013.01); *B29K 2105/0094* (2013.01); *B29K 2995/0024* (2013.01); *G02B 2207/101* (2013.01); *G02F 1/133502* (2013.01)

(58) Field of Classification Search
CPC .......... B29K 2033/04; B29K 105/0094; B29K 2995/0024
USPC ........................................................ 359/613
See application file for complete search history.

(56) References Cited

U.S. PATENT DOCUMENTS

| | | | | |
|---|---|---|---|---|
| 2007/0204953 | A1* | 9/2007 | Lin | B05D 1/28 156/242 |
| 2010/0079868 | A1* | 4/2010 | Asakura | G02B 5/0226 359/586 |
| 2012/0069443 | A1* | 3/2012 | Taguchi | G02B 1/118 359/601 |
| 2013/0215514 | A1* | 8/2013 | Kim | B32B 7/02 359/601 |
| 2014/0285695 | A1* | 9/2014 | Yamamoto | G02B 1/04 348/294 |
| 2015/0014894 | A1* | 1/2015 | Kodama | B82Y 10/00 264/447 |
| 2015/0044417 | A1* | 2/2015 | Koike | G03F 7/0002 428/137 |
| 2015/0079341 | A1* | 3/2015 | Tazaki | B29C 33/68 428/141 |

FOREIGN PATENT DOCUMENTS

| | | |
|---|---|---|
| KR | 10-2008-0014429 | 2/2008 |
| KR | 10-2008-0113259 | 12/2008 |
| KR | 10-0888904 | 3/2009 |
| KR | 10-2009-0084340 | 8/2009 |
| KR | 10-2010-0081976 | 7/2010 |
| KR | 10-2011-0006163 | 1/2011 |
| WO | 2009-041646 | 4/2009 |
| WO | 2013-025614 | 2/2013 |
| WO | 2013-141251 | 9/2013 |
| WO | 2013-183708 | 12/2013 |

OTHER PUBLICATIONS

KIPO, Office Action of Application No. 10-2015-0134921, dated Dec. 30, 2016.
SIPO, Office Action of Application No. 201580051845.6, dated Jan. 17, 2018.
JPO, Notification of Reasons for Refusal of JP 2017-516141 dated Mar. 6, 2018.
EPO, The extended European search report of EP 15844402.6 dated Apr. 4, 2018.

* cited by examiner (a)　　　　　　　　　　(b)

(a)　　　　　　　　　　(b)

OPTICAL SHEET COMPRISING NANOPATTERN AND METHOD FOR MANUFACTURING SAME

TECHNICAL FIELD

The present invention relates to an optical sheet for use in a liquid crystal display, and more particularly to an optical sheet having a nanopattern and a method of manufacturing the same.

BACKGROUND ART

Through various studies these days, the case where fine irregular structures having a period equal to or less than that of a visible light wavelength range (about 380 to 780 nm) are formed on the surface of optical devices such as displays, light-emitting diodes, solar cells, etc. is known to exhibit an antireflective effect and a lotus effect to thus increase the efficiency of optical devices. Such a fine irregular structure, which is called a moth-eye structure, plays a role in buffering changes in refractive index between two media having different refractive indexes. Specifically, when light passes through two different media, reflection occurs due to the difference in refractive index, but the refractive indexes of two media are continuously increased in the presence of the fine irregularity between the two media, thus preventing such reflection.

The formation of a fine irregular structure on the surface of an optical device may include, for example, the method including the following steps of (i) to (iii) (nano-imprinting):

(i) supplying an active energy ray-curable composition between a mold having a structure complementary to a fine irregular structure and a substrate film, which is the base of a light-transmitting film;

(ii) forming a cured resin layer having a fine irregular structure on the surface of the substrate film by curing the active energy ray-curable composition through irradiation with an active energy ray such as UV light or the like; and (iii) separating the mold from the cured resin layer.

However, the mold has pores having a period on the nanometer scale and a relatively large aspect ratio, and thus the contact interface between the mold and the active energy ray-curable composition becomes large. Thereby, it is difficult to accurately imprint the pattern of the mold on the cured resin layer, and the separation of the mold in step (iii) becomes very difficult with an increase in the interfacial force. In particular, since the separation of the mold is directly associated with productivity, some patents for solving this problem have been disclosed.

In this regard, Japanese Patent Application Publication No. 2007-326367 discloses a method of treating a surface, having a fine irregular structure, of a mold with a release agent (an external release agent), and Japanese Patent Application Publication No. 2009-061628 discloses the use of a light-curable transfer layer in a solid phase comprising a light-curable resin composition including a phosphoric acid ester-based compound as an internal release agent. However, in the case where only the treatment with the release agent is simply performed, as in the above patents, releasability may gradually decrease due to the repeated transfer process, or the surface of the mold may become contaminated due to the deposition of the release agent.

Meanwhile, the substrate film on which the cured resin layer having a fine irregular structure is formed is made of PE, PC, PMMA, etc., and such a substrate film has high transparency and flexibility but is disadvantageous in that it is prone to wrinkling and curling. Also, properties such as strength and the like may be improved due to the use of the substrate film, but it is difficult to form a thin film, and the reduction in the manufacturing cost is limited.

Moreover, as shown in FIG. 1, a multilayer structure including a substrate film and a cured resin layer is conventionally formed, and thus light transmission loss may occur at the interlayer interface and non-transmitted light may act as a cause of reflection. Therefore, techniques that do not use the substrate layer have been devised, but are merely implemented in a manner in which the substrate film is stripped through chemical treatment after the formation of the resin layer, and a pattern to be formed is limited to a micro scale.

DISCLOSURE

Technical Problem

Accordingly, the present invention is intended to provide an non-substrate(substrate-less)-type optical sheet having a nanopattern, in which a conventional pattern transfer process such as a roll-to-roll process or a stamp process is applied but a substrate film is not used and a nanopattern is formed using only a curable resin, whereby light transmission loss (reflection) at the interface with a substrate does not occur and a high transmittance of 95% or more is exhibited.

Technical Solution

A first preferable embodiment of the present invention provides a method of manufacturing an optical sheet, comprising the following steps of (S1) to (S3):

(S1) forming a single layer by feeding a curable resin composition; (S2) obtaining the single layer having a transferred nanopattern on a surface thereof by passing the single layer formed in (S1) through a release mold having a nanopattern having a pitch of 50 to 500 nm and an aspect ratio of 1.0 to 5.0; and (S3) curing the single layer having the transferred nanopattern obtained in (S2).

In the first embodiment, the curable resin composition may include 100 parts by weight of a urethane acrylate having a weight average molecular weight of 100 to 30,000 and 75 to 250 parts by weight of a fluorine-containing siloxane-acrylate oligomer having a weight average molecular weight of 100 to 10,000 based on 100 parts by weight of the urethane acrylate. Here, the curable resin composition may further include, based on 100 parts by weight of the urethane acrylate, 60 to 125 parts by weight of a diluent and 10 to 25 parts by weight of a polymerization initiator. Accordingly, the curable resin composition may have a viscosity of 100 to 300 cps.

Also in the first embodiment, (S2) may include pre-curing the single layer with light at a dose of 50 to 150 mj/cm$^2$ while transferring the nanopattern, and the release mold, which is used to transfer the pattern, may be coated with at least one release agent selected from the group consisting of silicone, fluorine and Teflon.

In addition, a second preferable embodiment of the present invention provides an optical sheet, which is formed from a curable composition comprising 100 parts by weight of a urethane acrylate having a weight average molecular weight of 100 to 30,000 and 75 to 250 parts by weight of a fluorine-containing siloxane-acrylate oligomer having a weight average molecular weight of 100 to 10,000 based on 100 parts by weight of the urethane acrylate, and which has a plurality of nanopatterns having a pitch of 50 to 500 nm and an aspect ratio of 1.0 to 5.0 on at least one surface thereof.

In the second embodiment, the optical sheet may have a transmittance of 95% or more, upon irradiation with light at 550 nm, and a curl value of 0 mm to 2.0 mm at 23° C.

In the second embodiment, the optical sheet may be manufactured by the method according to the first embodiment.

Advantageous Effects

According to the present invention, an optical sheet is an non-substrate(substrate-less)-type optical sheet that does not use a substrate, and thus does not generate reflection (light loss) due to the difference in refractive index at the interface between a substrate layer and a resin pattern layer, thereby exhibiting a transmittance of 95% or more and simultaneously improving condensing and diffusion properties of light.

Also, an optical sheet having a monolayer structure can be manufactured using only a curable resin, and can exhibit superior wrinkling and curling properties even after a reliability test under constant temperature and humidity (60° C., RH85%) and high-temperature (120° C.) conditions, making it possible to manufacture a highly reliable optical sheet and to form a thin film. Furthermore, a conventional roll-to-roll process can be applied without change, thus ensuring mass production and price competitiveness by virtue of a reduction in the manufacturing cost without the use of a substrate film during the processing.

DESCRIPTION OF THE REFERENCE NUMERALS OF THE DRAWINGS

Figure 1:
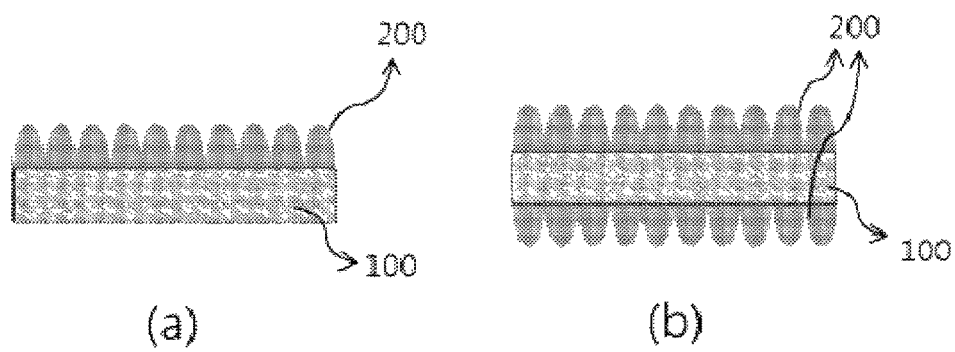
FIG. 1 shows cross-sectional views of a typical nanopattern optical sheet including a nanopattern layer on one surface or both surfaces of a substrate layer.

1: release mold (soft mold) 2: release mold (hard mold)
11: guide roll 12: press roll
13: winding roll 14: slot die
100: substrate layer 200: pattern layer

BEST MODE

An aspect of the present invention addresses a method of manufacturing an optical sheet, comprising: (S1) forming a single layer by feeding a curable resin composition; (S2) obtaining the single layer having a transferred nanopattern on a surface thereof by passing the single layer formed in (S1) through a release mold having a nanopattern having a pitch of 50 to 500 nm and an aspect ratio of 1.0 to 5.0; and (S3) curing the single layer having the transferred nanopattern obtained in (S2).

A conventional optical sheet having a micropattern or a nanopattern is manufactured by coating the upper surface of a substrate film (a substrate layer) made of PET, PC, PMMA, TAC, COC, or COP with a curable resin and then performing patterning (forming a pattern layer). However, as shown in FIG. 1, light loss may occur at the interface between the substrate layer 100 and the pattern layer 200, thereby remarkably decreasing transmittance or frequently causing light reflection. Furthermore, in order to solve such problems, the fabrication of an optical sheet having a monolayer structure by forming a pattern layer on a substrate layer and then removing the substrate layer has been proposed, but additionally requires the separation of the substrate layer, and thus the fabrication process thereof becomes very difficult, and limitations are imposed on the application of such a fabrication process to actual processing.

Moreover, when a nano-scale pattern is transferred onto the optical sheet, the surface area on which the curable resin comes into contact with the mold increases and the releasability from the mold is somewhat decreased, making it very difficult to form an optical sheet having a nanopattern without the use of the substrate layer as in conventional cases.

Figure 2:
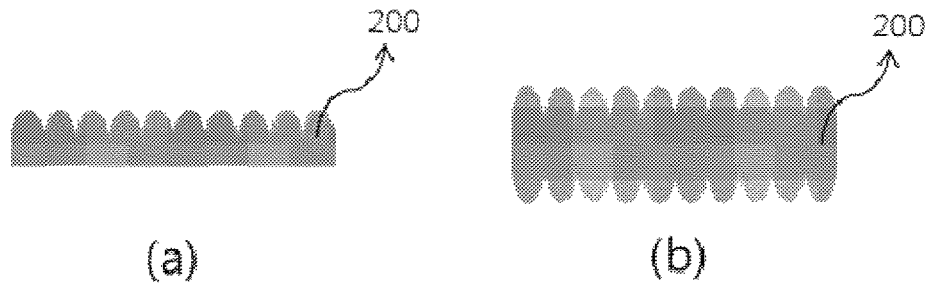
FIG. 2 shows cross-sectional views of an non-substrate (substrate-less)-type optical sheet having a plurality of nanopatterns formed using a curable resin according to the present invention.

However, in the present invention, a conventional pattern transfer process such as a roll-to-roll process may be directly applied even without the use of an additional process, thus forming an non-substrate(substrate-less)-type optical sheet having no substrate layer, as shown in FIG. 2, in which a nano-scale pattern having a pitch of 50 to 500 nm and an aspect ratio of 1.0 to 5.0 is formed on at least one surface thereof.

In order to manufacture an non-substrate(substrate-less)-type optical sheet having a nano-scale pattern according to the present invention using a conventional imprinting process, the curable resin composition of the present invention preferably includes 100 parts by weight of a urethane acrylate having a weight average molecular weight of 100 to 30,000 and 75 to 250 parts by weight of a fluorine-containing siloxane-acrylate oligomer having a weight average molecular weight of 100 to 10,000 based on 100 parts by weight of the urethane acrylate.

Here, with the goal of preventing the finally manufactured optical sheet having no substrate layer from being excessively brittle or flexible, individual weight average molecular weights preferably fall in the above ranges, and the weight average molecular weights may be determined using a method of measuring the molecular weight of a polymer such as MALDS (Matrix-Assisted Laser Desorption Ionization Mass Spectrometry) or GPC (Gel Permeation Chromatography).

In particular, the urethane acrylate of the present invention is a main component that is added to impart the durability of an optical sheet, resistance to curling and yellowing, flexibility, and supporting capability as a single layer, and may be used in an amount of 20 to 40 wt % based on the total weight of the curable resin in terms of ensuring the above properties.

Also in the present invention, the fluorine-containing siloxane-acrylate oligomer is a main component that participates in a curing reaction, and has a molecular structure in which siloxane-acrylate is substituted with fluorine and thus may play an important role in increasing releasability from the mold after the curing process. For a typical optical sheet having a pattern, silicone acrylate having a weight average molecular weight of 900 to 1,500 is used to attain releasability from the mold. Silicone acrylate enables the transfer of a pattern on a micro scale but does not satisfy releasability on a nano scale. Furthermore, a fluorine resin may be used to obtain releasability. In this case, the resin tends to remain in the mold and contaminates the mold, making it difficult to attain repeatability.

In contrast, in the present invention, an oligomer configured such that siloxane-acrylate is substituted with fluorine is used as a main component, thus attaining both releasability and pattern repeatability. If the amount of the fluorine-containing siloxane-acrylate oligomer is less than 75 parts by weight based on 100 parts by weight of the urethane acrylate, releasability and a transfer rate may decrease, thus causing pattern clustering. On the other hand, when the amount thereof is 250 parts by weight or less, releasability may be sufficiently ensured. Hence, the amount thereof preferably does not exceed 250 parts by weight, taking into consideration the price of fluorine.

In the present invention, the curable resin composition may further include, based on 100 parts by weight of the urethane acrylate, 60 to 125 parts by weight of a diluent and 10 to 25 parts by weight of a polymerization initiator. In the present invention, the diluent may be added to adjust the viscosity of the resin, and is preferably an acrylate-based monomer. Since all of the diluent and the main components contain acrylate-based monomers, the double bond of the vinyl group breaks down and thus radical polymerization occurs and a curing reaction may be easily carried out.

Here, the amount of the diluent preferably falls in the above range in order to maintain the viscosity of the resin in the range of 100 to 300 cps. If the viscosity of the curable resin composition is less than 100 cps, flowability of the composition may excessively increase during the roll-to-roll imprinting process, thus causing variation in film thickness. On the other hand, if the viscosity thereof exceeds 300 cps, the composition may penetrate into the nanopattern, making it difficult to form a desired pattern.

In the present invention, the polymerization initiator may be at least one selected from the group consisting of a phosphine oxide-based polymerization initiator, a propanone-based polymerization initiator, a ketone-based polymerization initiator and a formate-based polymerization initiator, and is preferably added in an amount of 10 to 25 parts by weight based on 100 parts by weight of the urethane acrylate in order to prevent coloring or deterioration of mechanical strength during the polymerization reaction.

Furthermore, the curable resin composition of the present invention may further include, but is not necessarily limited to, at least one additive selected from the group consisting of a UV absorbent, a UV stabilizer, a color stabilizer, a leveling agent, an antioxidant, a defoaming agent, and an antistatic agent.

Figure 3:
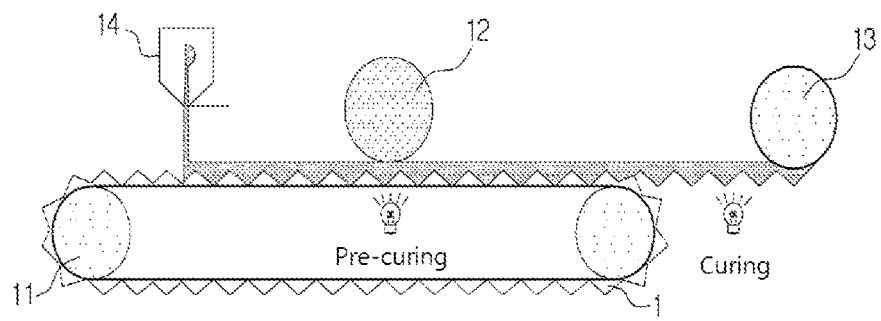
FIG. 3 is a schematic view showing a roll-to-roll process for forming a pattern on one surface of a single layer (a curable resin) using a release mold (a soft mold) having a nanopattern according to an exemplary embodiment.
Figure 4:
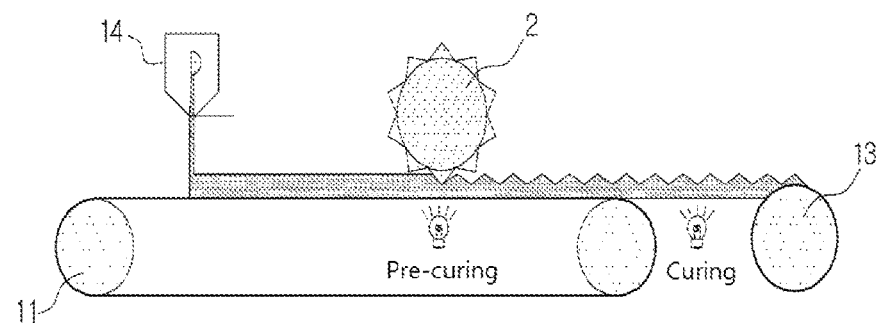
FIG. 4 is a schematic view showing a roll-to-roll process for forming a pattern on one surface of a single layer (a curable resin) using a release mold (a hard mold) having a nanopattern according to another exemplary embodiment.
Figure 5:
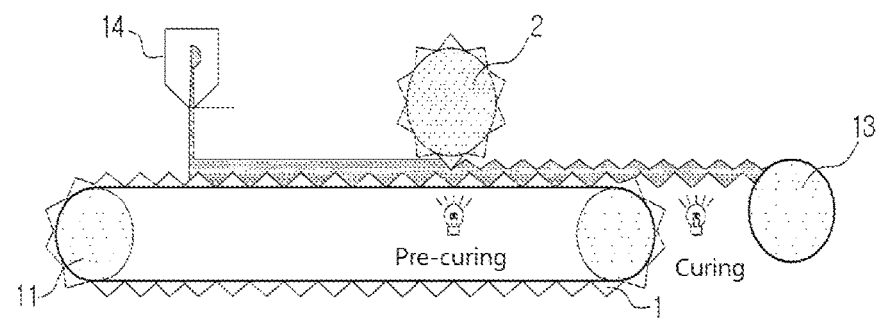
FIG. 5 is a schematic view showing a roll-to-roll process for forming a pattern on both surfaces of a single layer (a curable resin) using a release mold having a nanopattern according to a further exemplary embodiment.

Meanwhile, the optical sheet of the present invention may be manufactured using a roll-to-roll process or a stamp process, and preferably a roll-to-roll process. Here, the roll-to-roll process is performed using, as shown in FIGS. 3 to 5, two guide rolls 11 acting as shafts, a release mold 1, 2 having a nanopattern to form a pattern on an optical sheet, and a slot die 14 for feeding the curable resin composition in the form of a sheet.

In (S1) of the present invention, the curable resin composition is fed into a slot die to form a single layer. When the single layer is formed, the thickness thereof may be set in the range of 10 to 500 μm by adjusting the line speed of the roll-to-roll system depending on the end use thereof, but is not necessarily limited thereto. The single layer discharged from the slot die may be primarily cured before the formation of the nanopattern, but the present invention is not necessarily limited thereto.

While the single layer formed in (S1) passes through a release mold having a nanopattern (a soft mold: 1 of FIGS. 3 and 5, a hard mold: 2 of FIGS. 4 and 5), the pattern of the mold is transferred on one surface or both surfaces of the single layer, thus forming the pattern (S2). Here, the pattern may have a micro lens shape in which a hemispherical shape, a cylindrical shape, a trigonal pyramid shape, or a quadrangular pyramid shape is repeated, or a line grid shape, such as a prism or a lenticular pattern, but the present invention is not limited thereto. The nanopattern unit shape, which is observed on the cross-section when the single layer having the pattern is cut in a vertical direction, preferably has a pitch of 50 to 500 nm and an aspect ratio of 1.0 to 5.0. The pattern has a nano size within the above range, thus alleviating changes in refractive index due to the fine irregular structure.

In the present invention, the formation of the pattern on the single layer in (S2) is preferably carried out in a manner in which the single layer is pre-cured with light at a dose of 50 to 150 mj/cm$^2$ along with the pattern transfer. When pre-curing is implemented by irradiating the resin composition with light at a dose of 50 to 150 mj/cm$^2$, pattern crushing or layer tearing may be prevented upon release of the pattern from the mold, and curling properties and transmittance of the final optical sheet may be ensured, even without the use of the substrate layer. Here, if light is applied at a dose of less than 50 mj/cm$^2$ upon pre-curing, it is difficult to form the pattern without the use of the substrate, or the curling properties of the sheet may deteriorate. On the other hand, if the light dose exceeds 150 mj/cm$^2$, the non-substrate(substrate-less)-type sheet may be formed, but mold releasability and repeatability may decrease.

Furthermore, in the present invention, the release mold has to be efficiently released after the transfer of the pattern onto the single layer so as to be repeatedly usable in the roll-to-roll process, and should also be easily washed. Thus, according to a preferred aspect of the present invention, the release mold may be coated with at least one release agent selected from the group consisting of silicone, fluorine and Teflon.

The surface of the mold is treated with the release agent in a manner in which the mold body is immersed in the diluted solution of the release agent, or in which the release agent or the diluted solution thereof is applied on the surface of the mold body having the fine irregular structure. The immersion of the mold body in the diluted solution of the release agent is more preferably conducted because the surface of the mold body having the fine irregular structure may be uniformly treated with the release agent.

Subsequently, the single layer having the nanopattern formed in (S2) may be irradiated with light at a dose of 150 mj/cm$^2$ or more, and preferably 150 to 1,000 mj/cm$^2$, thus finally manufacturing an non-substrate(substrate-less)-type optical sheet having a nanopattern (S3). Here, if the light dose is less than 150 mj/cm$^2$, curing is not performed, and reliability may become problematic. On the other hand, if the light dose exceeds 1,000 mj/cm$^2$, brittleness may occur due to over-curing, undesirably causing problems related to handling or reliability. The light dose is not necessarily limited thereto, and the light dose and the degree of curing may become optimal taking into account the line speed in the roll-to-roll system upon curing.

Thereby, the optical sheet of the present invention may exhibit a transmittance of 95% or more upon irradiation with light at 550 nm and a curl value of 0 mm to 2.0 mm at 23° C. The optical sheet has the above optical characteristics and properties, and the present invention is able to provide an non-substrate(substrate-less)-type optical sheet having improved transmittance and stable reliability, compared to optical sheets including a substrate layer.

Mode for Invention

A better understanding of the present invention may be obtained through the following examples, which are set forth to illustrate, but are not to be construed as limiting the scope of the present invention.

Example 1

A curable resin composition having a viscosity of 150 cps was prepared by mixing, based on the total weight of a mixture, 50 wt % of, as a main compound, a fluorine-containing siloxane-acrylate oligomer having a weight average molecular weight of 5,500, 20 wt % of polyurethane acrylate having a weight average molecular weight of 1,800, 25 wt % of 1,6-hexandiol diacrylate as a diluent and 5 wt % of 1-hydroxy-cyclohexylphenyl-ketone as a polymerization initiator, and was then fed into a roll-to-roll system in which a release mold (available from Soken, Japan) was provided on only one surface of a sheet, as shown in FIG. 3 or 4, thus manufacturing an non-substrate(substrate-less)-type optical sheet having a nanopattern through the following method.

(S1): The prepared curable composition was fed into the slot die of the roll-to-roll system, thus forming a single layer having a thickness of 75 μm via the slot die 14.

(S2): The single layer formed in (S1) was fed into a release soft mold 1 having a nanoprism pattern having a pitch of 100 nm and an aspect ratio of 3.5, thus forming a moth-eye pattern on one surface of the single layer while transferring the pattern. Also, upon the transfer of the pattern, UV light was applied at a dose of 100 mj/cm$^2$ so that pre-curing was performed.

(S3): The single layer having the pattern formed in (S2) was cured with UV light at a dose of 500 mj/cm$^2$, finally manufacturing an optical sheet having a nanopattern.

Example 2

An optical sheet having a nanopattern was manufactured in the same manner as in Example 1, with the exception that the same pattern as in Example 1 was formed on both surfaces of the single layer in (S2) (the upper and lower patterns are the same) as shown in FIG. 5.

Example 3

An optical sheet having a nanopattern was manufactured in the same manner as in Example 1, with the exception that the light dose was changed to 50 mj/cm$^2$ upon pre-curing in (S2).

Example 4

An optical sheet having a nanopattern was manufactured in the same manner as in Example 1, with the exception that the light dose was changed to 150 mj/cm$^2$ upon pre-curing in (S2).

Example 5

An optical sheet having a nanopattern was manufactured in the same manner as in Example 1, with the exception that 30 wt % of the fluorine-containing siloxane-acrylate oligomer and 40 wt % of the urethane acrylate were added.

Comparative Example 1. Formation of Optical Sheet Having Nanopattern Including Substrate Layer An optical sheet having a nanopattern with a substrate layer was manufactured in the same manner as in Example 1, with the exception that the same curable composition as in Example 1 was used but a PET film (KOLON, 50 μm) was used as a substrate layer, and the curable composition was applied to a thickness of 25 μm on the substrate layer in (S1).

Comparative Example 2. Omission of Pre-Curing

The same curable composition as in Example 1 was used, and an attempt was made to omit pre-curing in (S2), but the curable composition became stuck to the mold, making it impossible to manufacture a sheet.

Comparative Example 3. Formation of Non-Substrate(Substrate-Less)-Type Optical Sheet Under Changed Pre-Curing Light Dose Conditions An optical sheet having a nanopattern was manufactured in the same manner as in Example 1, with the exception that the same curable composition as in Example 1 was used and the light dose was changed to 45 mj/cm$^2$ upon pre-curing in (S2).

Comparative Example 4. Formation of Non-Substrate(Substrate-Less)-Type Optical Sheet Under Changed Pre-Curing Light Dose Conditions An optical sheet having a nanopattern was manufactured in the same manner as in Example 1, with the exception that the same curable composition as in Example 1 was used and the light dose was changed to 160 mj/cm$^2$ upon pre-curing in (S2).

Comparative Example 5. Formation of Non-Substrate(Substrate-Less)-Type Optical Sheet Using Curable Composition Having Different Component Ratio An non-substrate(substrate-less)-type optical sheet having a nanopattern was manufactured in the same manner as in Example 1, with the exception that 10 wt % of the fluorine-containing siloxane-acrylate oligomer and 60 wt % of the urethane acrylate were added.

Comparative Example 6. Formation of Non-Substrate(Substrate-Less)-Type Optical Sheet Using Curable Composition Having Different Component An non-substrate(substrate-less)-type optical sheet having a nanopattern was manufactured in the same manner as in Example 3, with the exception that 30 wt % of polysiloxane acrylate (available from Miwon) having a molecular weight of 1,100 was added in lieu of the fluorine-containing siloxane-acrylate oligomer.

Comparative Example 7. Formation of Non-Substrate(Substrate-Less)-Type Optical Sheet Using Curable Composition Having Different Component and Different Component Ratio An non-substrate(substrate-less)-type optical sheet having a nanopattern was manufactured in the same manner as in Example 3, with the exception that 10 wt % of polysiloxane acrylate (available from Miwon) was further added and 30 wt % of the urethane acrylate was added.

Comparative Example 8. Formation of Non-Substrate(Substrate-Less)-Type Optical Sheet Using Typical Curable Composition An attempt was made to manufacture an non-substrate (substrate-less)-type optical sheet having a nanopattern in the same manner as in Example 1, with the exception that the fluorine-containing siloxane-acrylate oligomer or the polysiloxane acrylate was not added and only the urethane acrylate was added in an amount of 70 wt %, but the composition became stuck to the mold and the pattern could not be formed.

The components of the curable compositions used to manufacture the optical sheets of Examples 1 to 5 and Comparative Examples 1 to 8 are summarized in Table 1 below.

TABLE 1

| | Examples 1 to 4 and Comp. Examples 1 to 4 | Comp. Example 5 | Comp. Example 5 | Comp. Example 6 | Comp. Example 7 | Comp. Example 8 |
|---|---|---|---|---|---|---|
| Compound A[1] | 50 | 30 | 10 | — | 30 | — |
| Compound B[2] | — | — | — | 30 | 10 | — |
| Compound C[3] | 20 | 40 | 60 | 40 | 30 | 70 |
| Diluent[4] | 25 | 25 | 25 | 25 | 25 | 25 |
| Curing agent[5] | 5 | 5 | 5 | 5 | 5 | 5 |

[1] Compound A: Fluorine-containing siloxane-acrylate oligomer
[2] Compound B: Polysiloxane acrylate
[3] Compound C: Urethane acrylate
[4] Diluent: (1,6-Hexandiol diacrylate)
[5] Curing agent: (1-Hydroxy-cyclohexylphenyl-ketone)

Also, in Examples 1 to 5 and Comparative Examples 1 to 8, except for Comparative Example 2 (without pre-curing) and Comparative Example 8 (using a typical composition), in which the formation of the pattern itself was impossible, releasability, light transmittance and curling properties were measured through the following methods. The results are shown in Table 2 below.

<Measurement>

Measurement of Transfer Rate (Releasability) and Repeatability

For releasability, when transfer was not performed on the prism after removal of the mold or from the mold after patterning, an outer appearance had defects. The case where defects were observed with the naked eye was determined to be NG (Not Good) and the case where the pattern transfer rate was 90% or more after release upon observation with SEM was determined to be good. Upon five consecutive transfers, when the transfer rate of the optical film was maintained at the same level, repeatability was determined to be good, but when the transfer rate was decreased by 20% or more due to the surface contamination of the mold based on the results of five consecutive transfers, repeatability was determined to be poor.

Measurement of Light Transmittance

The sheet was cut to a size of 5 cm*5 cm, and the transmittance thereof was measured at a wavelength of 550 nm using a spectrophotometer (CM-3600).

Measurement of Curling Properties

A sample was subjected to reliability testing under the condition that it was allowed to stand at a temperature of 65° C. and a humidity of 85% for 1,000 hr, after which the sample was allowed to stand at room temperature (23° C.) for 1 hr, and the curling properties thereof were measured using a steel ruler or a gap gauge.

TABLE 2

| | Presence of substrate layer | Pattern formation | Transfer rate | Repeatability (5 times) | Light transmittance (%, 550 nm) | Curl (nm) |
|---|---|---|---|---|---|---|
| Ex. 1 | X | One surface | Good | Good | 96.5 | 0.5 or less |
| Ex. 2 | X | Both surfaces | Good | Good | 99.5 | 0.5 or less |
| Ex. 3 | X | One surface | Good | Good | 96.1 | 0.5 or less |
| Ex. 4 | X | One surface | Good | Good | 95.7 | 0.5 or less |
| Ex. 5 | X | One surface | Good | Good | 96.4 | 0.5 or less |
| C. Ex. 1 | O | One surface | Good | Good | 94.5 | 2.5 mm |
| C. Ex. 2 | The composition was completely stuck to the mold and the formation of the non-substrate(substrate-less)-type sheet was impossible | | | | | |
| C. Ex. 3 | X | One surface | Good | Good | 96.1 | 2.2 mm |

TABLE 2-continued

| | Presence of substrate layer | Pattern formation | Transfer rate | Repeatability (5 times) | Light transmittance (%, 550 nm) | Curl (nm) |
|---|---|---|---|---|---|---|
| C. Ex. 4 | X | One surface | Mold releasability X | X | 95.7 | 0.5 or less |
| C. Ex. 5 | X | One surface | Poor (pattern clustering) | Not measured | 90.1 | 0.5 or less |
| C. Ex. 6 | X | One surface | Poor | Not measured | Not measured | Not measured |
| C. Ex. 7 | X | One surface | Fair | Poor | 96.2 | 0.5 or less |
| C. Ex. 8 | The composition was completely stuck to the mold and the formation of the non-substrate(substrate-less)-type sheet was impossible | | | | | |

As is apparent from Table 2, in Examples 1 to 5, all of the transfer rate, repeatability, light transmittance and curling properties were superior, and particularly, light transmittance and curling properties were significantly improved, compared to Comparative Example 1 including the substrate layer. Based on the results of Comparative Examples 3 and 4, when the light dose was less than 50 mj/cm$^2$ upon pre-curing, curling properties became poor. On the other hand, when the light dose exceeded 150 mj/cm$^2$, the non-substrate(substrate-less)-type sheet was manufactured but the mold releasability was poor, thus deteriorating productivity.

For the curable composition, if the amount of the fluorine-containing siloxane-acrylate oligomer was less than 30 wt % based on the total weight of the composition, as in Comparative Example 5, pattern clustering occurred, thus making it impossible to form a fine nanopattern, thereby significantly decreasing light transmittance. In Comparative Example 6, using the typical polysiloxane acrylate containing no fluorine in lieu of the fluorine-containing siloxane-acrylate oligomer, releasability was significantly decreased, and thus the nanopattern was not formed. Even when the fluorine-containing siloxane-acrylate oligomer was added in an amount of 30 wt % or more in Comparative Example 7, it was used in a mixture with the polysiloxane acrylate and thus transfer was somewhat possible, but the fluorine content was relatively low, and thus repeatability was low, thereby making it unsuitable for use in mass production.

The invention claimed is:

1. A method of manufacturing an optical sheet, comprising:
   (S1) forming a single layer by feeding a curable resin composition;
   (S2) obtaining the single layer having a transferred nanopattern on a surface thereof by passing the single layer formed in (S1) through a release mold having a nanopattern having a pitch of 50 to 500 nm and an aspect ratio of 1.0 to 5.0; and
   (S3) curing the single layer having the transferred nanopattern obtained in (S2),
   wherein the curable resin composition in (S1) comprises 100 parts by weight of a urethane acrylate having a weight average molecular weight of 100 to 30,000 and 75 to 250 parts by weight of a fluorine-containing siloxane-acrylate oligomer having a weight average molecular weight of 100 to 10,000 based on 100 parts by weight of the urethane acrylate.

2. The method of claim 1, wherein the curable resin composition in (S1) further comprises, based on 100 parts by weight of the urethane acrylate, 60 to 125 parts by weight of a diluent and 10 to 25 parts by weight of a polymerization initiator.

3. The method of claim 1, wherein the curable resin composition in (S1) has a viscosity of 100 to 300 cps.

4. The method of claim 1, wherein (S2) comprises pre-curing the single layer with light at a dose of 50 to 150 mj/cm$^2$ while transferring the nanopattern.

5. The method of claim 1, wherein the release mold is coated with at least one release agent selected from the group consisting of silicone, fluorine and Teflon.

6. An optical sheet, which is formed from a curable composition comprising 100 parts by weight of a urethane acrylate having a weight average molecular weight of 100 to 30,000 and 75 to 250 parts by weight of a fluorine-containing siloxane-acrylate oligomer having a weight average molecular weight of 100 to 10,000 based on 100 parts by weight of the urethane acrylate, and which has a plurality of nanopatterns having a pitch of 50 to 500 nm and an aspect ratio of 1.0 to 5.0 on at least one surface thereof.

7. The optical sheet of claim 6, wherein the optical sheet has a transmittance of 95% or more upon irradiation with light at 550 nm.

8. The optical sheet of claim 6, wherein the optical sheet has a curl value of 0 to 2.0 mm at 23° C.

9. The optical sheet of claim 6, wherein the optical sheet is manufactured by the method of claim 1.

* * * * *